United States Patent Office 3,284,452
Patented Nov. 8, 1966

3,284,452
1:4-DIAZINE PREPARATION AND CERTAIN PTERIDENES PRODUCED THEREBY
Paul Schmidt, Therwil, Kurt Eichenberger, Basel, Alberto Rossi, Oberwil, Basel-Land, and Max Wilhelm, Basel, Switzerland, assignors to Ciba Corporation, New York, N.Y., a corporation of Delaware
No Drawing. Filed June 18, 1963, Ser. No. 288,625
Claims priority, application Switzerland, June 22, 1962, 7,533/62; Sept. 7, 1962, 10,632/62; Oct. 12, 1962, 12,055/62; May 31, 1963, 6,828/63
30 Claims. (Cl. 260—247.5)

The present invention provides a new process for the preparation of 1:4-diazine compounds that carry an amino group in 3-position and contain a fused ring in 5:6-position and may be unsubstituted in 2-position or contain in 2-position a hydroxyl group or an oxo group or a possibly substituted hydrocarbon radical and, if they have an oxo group in 2-position, may be substituted in 1-position by the organic radical of an alcohol, and also of the salts thereof.

The new process consists in reacting ammonia or an amine upon a compound of the formula

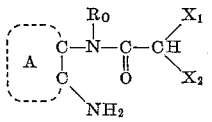

in which $X_1$ and $X_2$ each represents a free, etherified or esterified hydroxyl group, for example, an alkoxy or alkanoyloxy group or a halogen atom or together represent an oxo group; the cyclic portion represents a ring to which is attached a free amino group at the ortho-position; R represents hydrogen or a hydroxyl group or a hydrocarbon radical that may be substituted, and R' and R" together represent a second bond or R' represents the organic radical of an alcohol, and R and R" together represent an oxo group—and the compound so obtained is treated with a dehydrogenating agent, either at the same time or subsequent to the reaction.

In the startling materials to be used in the process of the invention, the cyclic portion represents, for example, an alicyclic radical, such as a cycloalkyl radical, for example a cyclopentyl, cyclohexyl or cycloheptyl radical, or an aromatic radical, advantageously an at most binuclear radical, such as a naphthyl or more especially a phenyl radical or a heterocylic radical that is bound to the nitrogen atom with a cyclic carbon atom that is vicinal to another cyclic carbon atom, such as a pyrimidyl-4 or -5, pyridyl-2 or -3, pyrazolyl-3 or -4, or pyridazyl-3 or -4 radical.

The radical R is preferably a hydrogen atom or a hydroxyl group. As hydrocarbon radicals that may be substituted there are primarily used possibly substituted lower aliphatic, cycloaliphatic, cycloaliphatic-aliphatic, aromatic or aromatic-aliphatic hydrocarbon radicals, such as appropriate alkyl, alkenyl, cycloalkyl, cycloalkenyl, cycloalkyl-alkyl, cycloalkenyl-alkyl, aryl, aralkyl or aralkenyl radicals. As substituents of those radicals there may be mentioned, for example, hydroxyl, alkoxy, halogens such as chlorine or bromine, amino, alkylamino or dialkylamino for aliphatic radicals; alkyl for cycloaliphatic radicals; and, for example, hydroxyl, alkoxy, alkylenedioxy, alky, halogen, trifluoromethyl, nitro amino or dialkylamino for aromatic radicals. As alkyl radicals in the aforementioned groups there may be mentioned more especially methyl or ethyl radicals, straight or branched propyl, butyl, pentyl or hexyl radicals bound at any position; as alkenyl radicals there may be mentioned more especially allyl radicals; as cycloalkyl radicals there may be mentioned more especially cyclopentyl, cyclohexyl or cycloheptyl radicals; as cycloalkenyl radicals there may be mentioned more especially cyclopentenyl or cyclohexenyl radicals; as aryl radicals there may be mentioned more especially phenyl radicals; and as aralkyl or aralkenyl radicals there may be mentioned more especially benzyl, α-phenyl-ethyl, β-phenyl-ethyl or phenyl-vinyl radicals.

The above-mentioned organic radical of an alcohol is, for example, a hydrocarbon radical that may be substituted, as is described for R above. It may also be a heterocyclic radical, such as a pyridyl, quinolyl or thienyl radical.

The cylic radical the cylic portion may contain other substituents in addition to the amino group. If it is an alicyclic radical it may have attached to it, for example, alkyl groups, such as those defined above. If it is an aromatic or heterocyclic radical there are used, for example, the substituents given above for phenyl radicals. For pyrimidyl radicals there are mentioned more especially amino groups or hydroxyl or mercapto groups, so that the cyclic portion may be, for example, a 2-$R_1$-pyrimidyl-5 radical which carries a free amino group at 4-position and in which $R_1$ represents hydrogen, an optionally substituted hydrocarbon radical or a free or substituted amino group.

The amines to be used as starting materials in the process of the invention are primary or advantageously secondary amines, and as substituents there may be mentioned, for example, the possibly substituted hydrocarbon radicals defined above for R, especially alkyl radicals, or alkylene radicals in which the alkylene chain may be interrupted by hetero atoms, such as oxa- or azaalkylene radicals, for example butylene-1:4), pentylene-(1:5), hexylene-(1:5), hexylene-(1:6), heptylene-(2:6), 3-oxa or 3-aza-pentylene-(1:5), 3-methyl-, 3-ethyl- or 3-hydroxy-ethyl - 3-aza-pentylene-(1:5), 3-aza-hexylene-(1:6) or 4-methyl-4-aza-heptylene-(2:6).

Of each of the afore-mentioned hydrocarbon radicals, whether or not the hydrocarbon radical is part of a larger radical, the lower hydrocarbon radical is preferred.

Starting materials of the foregoing formula that are preferably used are especially ortho-dichloro-acetylamino-anilines, 4-amino-5-dichloro-acetylamino-pirimidines and 4-amino-3-dichloro-acetylamino-pyrazoles.

The reaction with ammonia or with the amine is advantageously carried out by heating in the presence or absence of solvents, such as neutral solvents, for example alcohols, or optionally with an excess of the amine used, which in this case also serves as solvent.

As dehydrogenating agent there may be used, for example, sulfur or potassium permanganate. The dehydrogenation can also be carried out with selenium or oxygen, for example with oxygen in the presence of a catalyst such as platinum, or with hydrogen peroxide. The dehydrogenation can be carried out after the isolation of the intermediate product obtained after the first stage or without isolation. If the dehydrogenating agent is used at the same time as the ammonia or the amine, there is preferably used sulfur as dehydrogenating agent. The dehydrogenation is advantageously carried out in the presence of a solvent or diluent, for example of an alcohol, such as a lower alkanol, or water, or a liquid organic amine, such as a dialkylamine or an alkyleneimine or an oxaalkyleneimine.

The invention includes also any variant of the present process in which an intermediate product obtainable at any stage thereof is used as starting material and the remaining step or steps is/are carried out, or the process is discontinued at any stage thereof, or a starting material is formed under the reaction conditions, or is used in the form of a hydrate or a salt.

The starting materials are known or can be made by known methods.

The dehydro compounds obtained as intermediates when the present process is performed in two stages are likewise included in the present invention.

Some of the diazines defined above and obtained by the process of the invention and the corresponding dihydro compounds obtained as intermediates are known. They are valuable intermediate products, especially for use in the preparation of medicaments. Compounds of this kind are also useful on account of their pharmacological actions, especially on account of their diuretic and sodium-excretive action. Thus, they can be used pharmacologically in animals or as diuretics.

Especially valuable in this respect are the new compounds of the formula

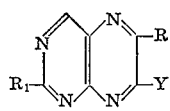

in which R has the meaning given above and Y represents an amino group, for example an unsubstituted amino group or a substituted amino group of the kind defined above for the amines, and $R_1$ represents a hydrogen atom or a possibly substituted hydrocarbon radical, for example of the kind defined above, or an amino group, for example an unsubstituted amino group or a substituted amino group of the kind defined above for the amines, and the corresponding dihydro compounds and the salts of said compounds.

The final products of the process are obtained in the free state or in the form of their salts, depending on the reaction conditions and on the starting materials used. The salts of the new compounds can be converted into the free compounds in known manner, for example, acid addition salts by reaction with a basic agent. On the other hand, free bases that may be obtained can form salts with inorganic or organic acids. For the preparation of acid addition salts there are used more especially therapeutically useful acids, for example hydrohalic acids, for example hydrochloric acid or hydrobromic acid, perchloric acid, nitric acid or thiocyanic acid, sulfuric or phosphoric acids; or organic acids, such as formic acid, acetic acid, propionic acid, glycollic acid, lactic acid, pyruvic acid, oxalic acid, malonic acid, succinic acid, maleic acid, fumaric acid, malic acid, tartaric acid, citric acid, ascorbic acid, hydroxymaleic acid, dihydroxy-maleic acid, benzoic acid, phenylacetic acid, 4-amino-benzoic acid, 4-hydroxy-benzoic acid, anthranilic acid, cinnamic acid, mandelic acid, salicylic acid, 4-amino-salicylic acid, 2-phenoxybenzoic acid or 2-acetoxybenzoic acid, embonic acid, methanesulfonic acid, ethanesulfonic acid, hydroxyethanesulfonic acid, benzenesulfonic acid, para-toluenesulfonic acid, naphthalenesulfonic acid or sulfanilic acid; or methionine, trypthophan, lysine or arginine. Mono-salts or polysalts can be obtained. The salts can also be used to purify or identify the free bases.

The new, pharmacologically valuable compounds may be used as medicaments in the form of pharmaceutical preparations that contain the said compounds in conjunction or admixture with an organic or inorganic, solid or liquid pharmaceutical excipient suitable for enteral, for example oral, or parenteral administration. For making these preparations there are used substances that do not undergo reaction with the new compounds, for example water, gelatine, lactose, starch, magnesium stearate, talc, vegetable oils, benzyl alcohols, gums, polyalkylene glycols, cholesterol or other known medicinal excipients. The pharmaceutical preparations may be in the form of tablets, dragées or capsules, or in the form of liquids as solutions, suspensions or emulsions. They may be sterilized and/or contain assistants, such as preserving, stabilizing, wetting or emulsifying agents, salts for regulating the osmotic pressure or buffers. They may also contain other therapeutically useful substances.

The compounds may also be used in veterinary medicine, for example in one of the forms mentioned above, or in animal husbandry as feedstuffs or as additives to feedstuffs. The customary extenders or diluents or feedstuffs are used.

The following examples illustrate the invention:

Example 1

To 7.28 g. of 2-methyl-4-amino-5-dichloroacetylamino-pyrimidine dichloroacetate and 0.64 g. of sulfur are added 40 cc. of morpholine. The temperature increases rapidly. The mixture is then heated for 5 minutes in a bath having a temperature of 100° C. After cooling, the pH is adjusted to 7.0 with 2 N-hydrochloric acid, whereupon the 2-methyl-6-hydroxy-7-morpholino-pteridine of the formula

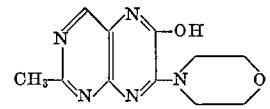

(melting point: 290 to 292° C.) precipitates. The melting point rises to 291 to 293° C. after recrystallization from alcohol.

The 2-methyl-4-amino-5-dichloroacetylamino-pyrimidine dichloroacetate used as starting material is prepared as follows:

37.2 g. of 2-methyl-4:5-diamino-pyrimidine and 115 cc. of dichloroacetic acid are kept for 1 hour in an oil bath having a temperature of 100° C. in a slight vacuum. After cooling, a sodium bicarbonate solution and solid bicarbonate are added to the reaction solution until the pH value is 1.8. The 2-methyl-4-amino-5-dichloroacetylamino-pyrimidine dichloroacetate of the formula

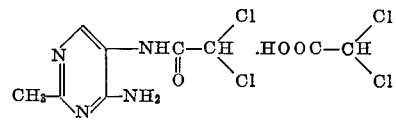

(melting point: 157 to 158° C.) then precipitates. The melting point is 163 to 164° C. when recrystallized from alcohol.

Example 2

0.91 g. of 2-methyl-4-amino-5-dichloroacetylamino-pyrimidine dichloroacetate and 5 cc. of morpholine are heated for 5 minutes in an oil bath having a temperature of 100° C. After cooling, water is added and the pH value is adjusted to 7 with 2 N-hydrochloric acid, whereupon 2-methyl-6-hydroxy-7-morpholino-7:8-dihydro-pteridine of the formula

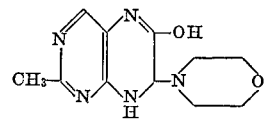

(melting point 225° C. [with decomposition] precipitates. The melting point rises to 230° C. (with decomposition) after recrystallization from alcohol.

0.25 g. of 2-methyl-6-hydroxy-7-morpholino-7:8-dihydro-pteridine and 32 mg. of sulfur are heated for 5 minutes in an oil bath having a temperature of 100° C. with 2 cc. of morpholine. After cooling, the reaction mixture is neutralized with 2 N-hydrochloric acid, whereupon the 2-methyl-6-hydroxy-7-morpholino-pteridine described in Example 1 precipitates.

Example 3

250 mg. of 2-methyl-6-hydroxy-7-morpholino-7:8-dihydro-pteridine (see Example 2) are dissolved in a solution of 112 mg. of potassium hydroxide in 16 cc. of water. To the solution so obtained are added dropwise, while stirring, 16.6 cc. of 0.2 N-potassium permanganate solution. After the potassium permanganate solution has been added, the manganese dioxide is filtered off, the alkaline solution is adjusted to pH 7, and then highly concentrated. The 2 - methyl-6 - hydroxy-7-morpholino-pteridine (M.P. 289 to 291° C.) described above precipitates.

Example 4

1.82 g. of 2-methyl-4-amino-5 - dichloroacetylamino-pyrimidine dichloroacetate and 0.16 g. of sulfur are mixed with 10 cc. of piperidine. The temperature increases rapidly. The mixture is then heated for 5 minutes in an oil bath having a temperature of 100° C. After cooling, the reaction mixture is adjusted to pH 7 with 2 N-hydrochloric acid, whereupon 2-methyl-6-hydroxy-7-piperidino-pteridine of the formula

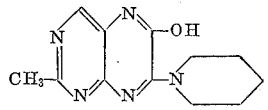

(M.P. 276 to 277° C.) precipitates.

Example 5

A mixture of 3.64 g. of 2-methyl-4-amino-5-dichloroacetylamino-pyrimidine dichloroacetate and 20 cc. of piperidine is heated for 5 minutes in an oilbath at 100° C., then allowed to cool, and 4 N-hydrochloric acid is added to establish a pH value of 7, whereupon the 2-methyl - 6-hydroxy-7-piperidino-7:8-dihydro-pteridine of the formula

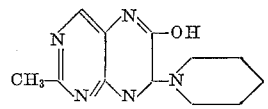

settles out; it melts at 192–195° C., with decomposition.

A mixture of 247 mg. of 2-methyl-6-hydroxy-7-piperidino-7:8-dihydro-pteridine, 32 mg. of sulfur and 2 cc. of piperidine is heated for 5 minutes in an oilbath at 100° C., then cooled and neutralized with 2 N-hydrochloric acid, whereupon the 2-methyl-6-hydroxy-7-piperidino-pteridine described in Example 4 settles out.

Example 6

3.64 g. of 2-methyl-4-amino-5-dichloroacetylamino-pyrimidine dichloroacetate and 0.32 g. of sulfur are mixed with 20 cc. of hexamethyleneimine. The temperature increases rapidly. The mixture is then heated for 5 minutes in an oil bath having a temperature of 100° C. After cooling, the reaction mixture is adjusted to pH 7 with 2 N-hydrochloric acid, whereupon 2-methyl-6-hydroxy-7-hexamethyleneimino-pteridine of the formula

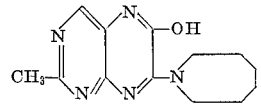

melting at 258–260° C. precipitates.

Example 7

4.35 g. of 2-morpholino-4-amino-5-dichloroacetyl-amino-pyrimidine dichloroacetate and 0.32 g. of sulfur are mixed with 20 cc. of morpholine. The temperature increases rapidly. The mixture is then heated for 5 minutes in a bath having a temperature of 100° C. After cooling, the reaction mixture is adjusted to a pH 7 with 2 N-hydrochloric acid, the precipitated crystals are filtered off with suction and boiled with 700 cc. of acetone. The insoluble portion is filtered off with suction to yield 2:7-dimorpholino-6-hydroxy-pteridine of the formula

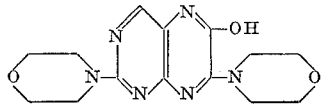

melting at 338° C. On concentrating the acetone solution to half its original volume, a further portion of the above pteridine crystallizes out. The acetone mother liquor is then very highly concentrated, the precipitated crystals are filtered off with suction and recrystallized from acetone. There is obtained α-[2-morpholino-4-amino - pyrimidyl - (5) - amino]-α-oxo-acetic acid thiomorpholide of the formula

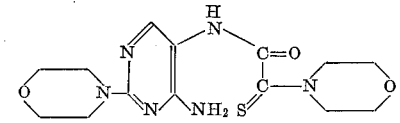

melting at 230° C. If the thiomorpholide is heated for 4 minutes at 235–240° C., hydrogen sulfide is eliminated. After recrystallization from acetone the above described pteridine is obtained.

The 2 - morpholino - 4 - amino-5-dichloroacetylamino-pyrimidine dichloroacetate used as starting material may be obtained in an analogous manner to the 2-methyl compound described in Example 1.

What is claimed is:

1. A process for the manufacture of 1:4-diazines, which comprises reacting a cyclic compound of the formula

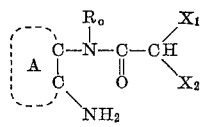

in which A stands for a cyclic ring selected from the group consisting of an alicyclic ring, a carbocyclic aromatic ring and a heterocyclic ring, $R_o$ stands for a member selected from the group consisting of hydrogen and hydrocarbon, $X_1$ and $X_2$ each stands for a member selected from the group consisting of hydroxyl, etherified hydroxyl, esterified hydroxyl, halogen and, when taken together, for the oxo group, with a compound selected from the group consisting of ammonia and an amine, and dehydrogenating the compound obtained.

2. A process as claimed in claim 1, wherein starting materials are used in which $X_1$ and $X_2$ each stands for a member selected from the group consisting of lower alkoxy, lower alkanoyloxy and halogen and, when taken together, for the oxo group.

3. A process as claimed in claim 1, wherein starting materials are used in which $X_1$ and $X_2$ represent chlorine atoms.

4. A process as claimed in claim 2, wherein starting materials are used in which $R_o$ stands for a member selected from the group consisting of hydrogen and hydrocarbon and $X_1$ and $X_2$ each stands for a member selected from the group consisting of lower alkoxy, lower alkanoyloxy and halogen and, when taken together, for the oxo group.

5. A process as claimed in claim 3, wherein starting materials are used in which $R_o$ stands for a member selected from the group consisting of hydrogen and hydrocarbon and $X_1$ and $X_2$ represent chlorine atoms.

6. A process as claimed in claim 4, wherein the dehydrogenation is carried out with a member selected from the group consisting of potassium permanganate, selenium, oxygen, hydrogen peroxide and sulfur.

7. A process as claimed in claim 5, wherein the dehydrogenation is carried out with a member selected from the group consisting of potassium permanganate, selenium, oxygen, hydrogen peroxide and sulfur.

8. A process as claimed in claim 6, wherein the reaction with the amine compound and the dehydrogenation with sulfur are carried out simultaneously.

9. A process as claimed in claim 7, wherein the reaction with the amine compound and the dehydrogenation with sulfur are carried out simultaneously.

10. A process as claimed in claim 1, wherein the reaction with a member selected from the group consisting of ammonia and an amine is carried out with heating.

11. A process as claimed in claim 1, wherein a compound is used as a starting material in which the cyclic portion is a member selected from the group consisting of an alicyclic ring, a carbocyclic aromatic ring and a heterocyclic ring which is bound to the nitrogen atom with a cyclic carbon atom which is vicinal to another cyclic carbon atom.

12. Process according to claim 11, wherein ammonia is used as starting material.

13. Process according to claim 11, wherein a disubstituted amine whose substituents are members selected from the group consisting of substituted and unsubstituted hydrocarbon radicals and substituted and unsubstituted hydrocarbon radicals which are interrupted by a member selected from the group consisting of sulfur, nitrogen and oxygen is used as starting material.

14. Process according to claim 1, wherein a starting material is used in which the cyclic portion is a member selected from the group consisting of cycloalkyl, phenyl, pyrimidyl-(4), pyrimidyl-(5), pyridyl-(2), pyridyl-(3), pyrazolyl-(3), pyrazolyl-(4), pyridazyl-(3) and pyridazyl-(4) each carrying at a carbon atom in ortho-position a free amino group and R stands for a member selected from the group consisting of hydrogen, hydroxyl and unsubstituted and substituted alkyl, alkenyl, cycloalkyl, cycloalkenyl, cyclo cycloalkyl-alkyl, cycloalkenylalkyl, aryl, aralkyl and aralkenyl.

15. Process according to claim 14, wherein ammonia is used as starting material.

16. A process as claimed in claim 15, wherein the reaction is carried out with a member selected from the group consisting of dialkylamines, alkyleneimines, oxaalkyleneimines, thiaalkyleneimines and aza - alkyleneimines.

17. A compound of the formula

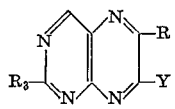

in which R represents hydroxyl, Y represents a member selected from the group consisting of amino, lower alkylamino, di-lower alkylamino, piperidino, pyrrolidino, morpholino and piperazino and R₃ stands for a member selected from the group consisting of hydrogen and lower alkyl.

18. A compound of the formula

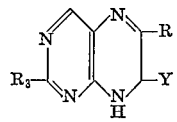

in which R represents hydroxyl, Y represents a member selected from the group consisting of amino, lower alkylamino, di-lower alkylamino, piperidino, pyrrolidino, morpholino and piperazino and R₃ stands for a member selected from the group consisting of hydrogen and lower alkyl.

19. A compound of the formula

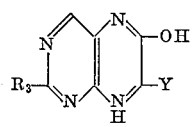

in which R₃ represents lower alkyl, and Y stands for a member selected from the group consisting of di-lower alkylamino, piperidino, pyrrolidino, morpholino, and piperazino.

20. A compound of the formula

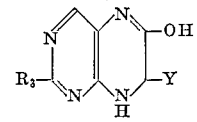

in which R₃ represents lower alkyl, and Y stands for a member selected from the group consisting of di-lower alkylamino, piperidino, pyrrolidino, morpholino, and piperazino.

21. A compound of the formula

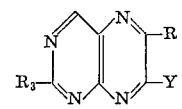

in which R represents hydroxyl, Y stands for a member selected from the group consisting of amino, lower alkylamino, di-lower alkylamino, piperidino, pyrrolidino, morpholino and piperazino and R₃ for a member selected from the group consisting of amino, lower alkylamino, di-lower alkylamino, piperidino, pyrrolidino, morpholino and piperazino.

22. A compound of the formula

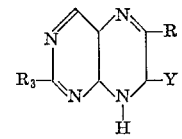

in which R represents hydroxyl, Y stands for a member selected from the group consisting of amino, lower alkylamino, di-lower alkylamino, piperidino, pyrrolidino, morpholino and piperazino and R₃ for a member selected from the group consisting of amino, lower alkylamino, di-lower alkylamino, piperidino, pyrrolidino, morpholino, and piperazino.

23. A compound of the formula

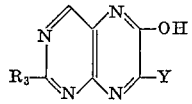

in which Y represents a member selected from the group consisting of di-lower alkylamino, piperidino, pyyolidino, morpholino and piperazino and R₃ represents a member selected from the group consisting of di-lower alkyl-amino, piperidino, pyrrolidino, morpholino and piperazino.

24. A compound of the formula

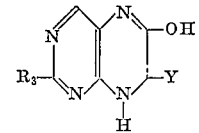

in which Y represents a member selected from the group constisting of di-lower alkylamino, piperidino, pyrrolidino, morpholino and piperazino and R₃ stands for a member selected from the group consisting of di-lower alkylamino, piperidino, pyrrolidino, morpholino and piperazino.

25. 2-methyl-6-hydroxy-7-morpholino-pteridine.

26. 2 - methyl - 6 - hydroxy-7-morpholino-7:8-dihydropteridine.

27. 2-methyl-6-hydroxy-7-piperidino-pteridine.

28. 2 - methyl - 6 - hydroxy-7-piperidino-7:8-dihydropteridine.

29. 2-methyl-6-hydroxy-7-hexamethyleneimino-pteridine.

30. 2:7-dimorpholino-6-hydroxy-pteridine.

References Cited by the Examiner

UNITED STATES PATENTS 2,525,150  10/1950  Smith _____ 260—251.5

OTHER REFERENCES

Jacobson: Chem. Abstracts, vol. 54, pp. 1754-5.

ALEX MAZEL, *Primary Examiner.*

HENRY R. JILES, *Examiner.*

R. J. GALLAGHER, *Assistant Examiner.*